United States Patent [19]

Ramsden, Jr.

[11] Patent Number: 5,334,838
[45] Date of Patent: Aug. 2, 1994

[54] RADIATION SENSOR

[75] Inventor: John W. Ramsden, Jr., Huntsville, Ala.

[73] Assignee: American Mining Electronics, Inc., Huntsville, Ala.

[21] Appl. No.: 989,164

[22] Filed: Dec. 11, 1992

[51] Int. Cl.$^5$ .............................................. G61V 5/00
[52] U.S. Cl. ................................ 250/361 R; 250/253; 250/363.10
[58] Field of Search ................... 250/361 R, 352, 253, 250/255, 363.18, 505.1

[56] References Cited

U.S. PATENT DOCUMENTS

| | | | |
|---|---|---|---|
| 3,011,057 | 11/1961 | Anger | 250/363.6 |
| 3,591,808 | 7/1971 | Prag et al. | 250/363.10 |
| 3,997,794 | 12/1976 | York et al. | 250/363.10 |
| 4,118,632 | 10/1978 | Luig | 250/363.10 |
| 4,155,594 | 5/1979 | Hartley et al. | 250/254 |
| 4,459,478 | 7/1984 | Powell | 250/253 |
| 4,931,638 | 6/1990 | Chernyak et al. | 250/253 |

*Primary Examiner*—Paul M. Dzierzynski
*Assistant Examiner*—Drew A. Dunn
*Attorney, Agent, or Firm*—Phillips & Beumer

[57] ABSTRACT

A radiation-sensing assembly adapted for sensing radiation emitted from a source of radiation which may be non-coal layers (shale and other materials) in a coal mine tunnel. The sensor assembly incudes a housing forming an enclosure for a radiation-sensing medium. A cover is provided on the top of the lower portion of the housing, and radiation passes through the cover to impinge on the sensing machine. The cover includes a collimator, which is built into the cover, to direct the radiation from the source to the sensing medium.

7 Claims, 2 Drawing Sheets

RADIATION SENSOR

FIELD OF THE INVENTION

The present invention relates generally to radiation sensors and more particularly to such a radiation sensor having a radiation sensing medium crystal mounted in a housing having integral collimating means which directs the radiation onto the sensing medium.

BACKGROUND OF THE INVENTION

Radiation sensors are well known in the art. One such radiation sensor is a Geiger counter which senses the emission of radiation from a radiating source and emits signals indicative of the number of charged particles impinging on a radiation sensitive crystal carried in the housing of the Geiger counter apparatus. Radiation sensors come in many different forms and are usable in many different environments.

In coal mining, for example, radiation sensors are used to detect radiation emissions from layers of shale and other materials carried in the ground. Typically, a coal mine is found to contain alternating layers of coal and shale (and other materials mixed in the shale). Radiation is generally emitted from the shale layer and through the inert coal layer. By sensing (counting) the number of charged particles striking a radiation sensor (crystal), the thickness of the coal layer can be deductively substantially determined.

In a coal mining operation, a mining machine is moved within a coal seam, and coal is extracted from the seam. The coal mining machine generally includes coal extraction apparatus which is movable in elevation while the coal mining machine is movable within the coal seam of the tunnel. Thus, the cuts must be such that while successively removing coal from the vertical surface of the coal seam, a predetermined thickness of coal is often desired to be left on the roof of the tunnel so as to prevent roof material (shale, etc.) from crashing down from above. If too much coal (roof coal) is left on the roof, much valuable and expensive coal is left in the mine, resulting in a very expensive mining operation; and, if too little roof coal is left, the layer of roof material can deteriorate, crumble, and fall, creating unsafe conditions.

In the past, one method of determining the thickness of the roof coal was to temporarily terminate the coal cutting operation and move the machine so that a drill may be used to bore through the coal layer until the coal layer was penetrated and the roof material layer contacted by the tip of the drill bit. Such procedure was time consuming and costly. Therefore, various arrangements of radiation sensing elements were resorted to in an effort to eliminate such time consuming and costly drilling procedures.

SUMMARY OF THE INVENTION

It is an object of the present invention, therefore, to provide a radiation sensor for detecting emissions of radiation from a source of radiation.

It is another object of the present invention to provide such a radiation sensor with a protective housing which shields a radiation sensitive medium, such as a crystal, carried in the housing.

It is yet another object of the present invention to provide the housing with integral collimating means so that charged particles are concentrated on the sensitive portion of the radiation sensitive crystal.

DESCRIPTION OF THE PREFERRED EMBODIMENT

Figure 1:
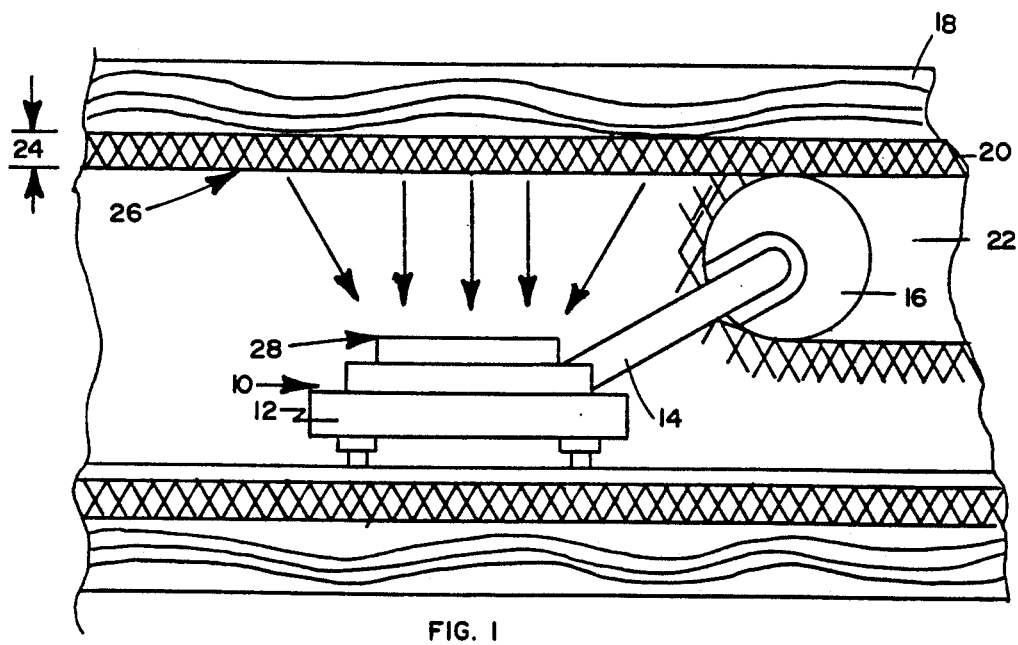
FIG. 1 is an elevational view of a longwall shearer in operational position in a coal mine. The radiation sensing device of the present invention is shown mounted on the longwall shearing machine.

As seen in FIG. 1, a longwall shearing machine 10 is shown to include a body 12 having a ranging arm 14 pivotally secured thereto and a cutter drum 16 mounted on the end of the ranging arm. Such machines are known in the art, and one such machine is disclosed in U.S. Pat. No. 4,154,084.

The structure of the coal interface is shown in FIG. 1 to include layers of materials 18, such as shale, etc., and coal 20. The materials 18 typically emit radiation which passes through the inert coal. The machine is movable along the vertical face 22 of the wall and provides successive cuts into the vertical wall while leaving a predetermined amount (thickness) 24 of coal at the roof 26 of the tunnel (roof coal) for reasons explained, supra.

To determine the thickness of the roof coal during the mining operation, a radiation sensor assembly 28 is mounted (supported) on the machine 10 to receive and indicate the amount of charged particles striking the radiation sensitive crystal of the sensor assembly. As the thickness of the roof coal decreases, the amount of signals emitted by the sensor increases since more radiation is passed through thinner roof coal.

Figure 2:
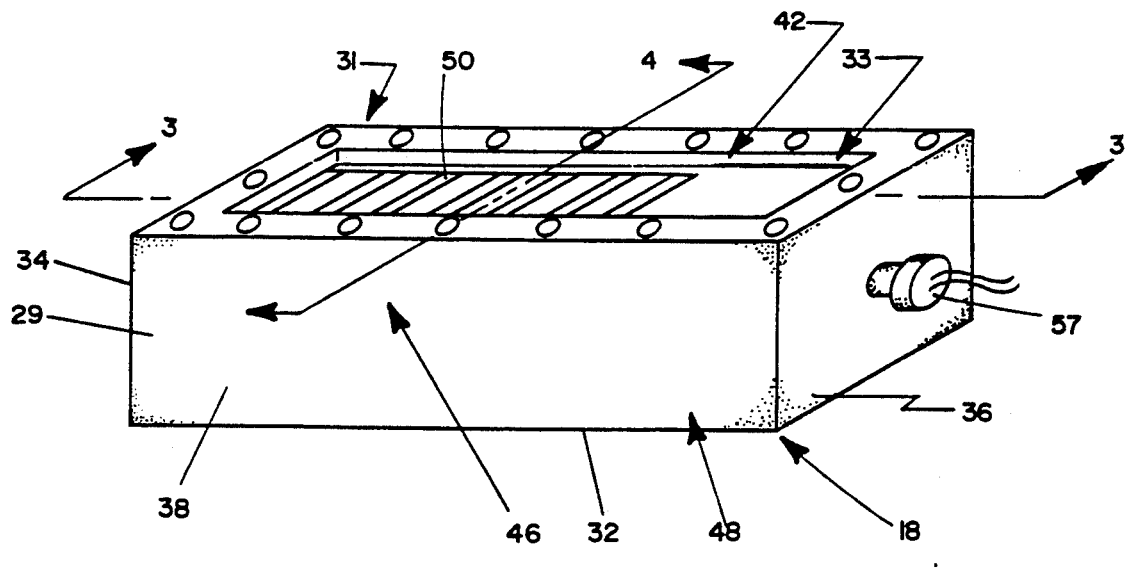
FIG. 2 is a pictorial view of the radiation sensor device of the present invention.

The radiation sensing device 28 is shown in the figures to include a rectangular housing 29 enclosing a crystal 30 (FIG. 2). The housing is shown to have two adjoining sections 31 and 33, a bottom wall 32, end walls 34 and 36, side walls 38 and 40, and a cover 42. A lead liner 44 is mounted to one end wall 34, the side walls 38 and 40, and a rear portion 46 of the bottom wall 32. The second portion 48 of bottom wall 32 and the end wall 36 need not be lined with lead since the electronics (and not the crystal) is mounted in this section of the housing.

Figure 3:
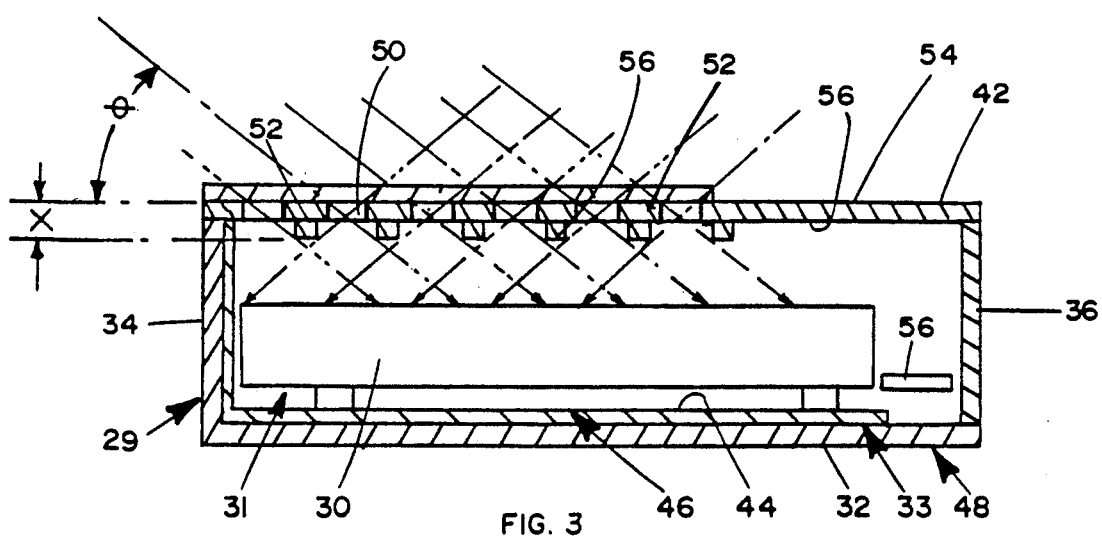
FIG. 3 is a longitudinal sectional view taken along line 3—3 of the device of FIG. 2.

Retaining cover 42 is provided with a series of elongated spaced openings 50 in a portion 52 thereof. A portion 54 of the cover does not contain these openings since the electronics and not the crystal is mounted in the section of the housing which is enclosed by cover portion 54. The electronics is indicated (in FIG. 3) by the numeral 56. The electronics includes electronic circuits which contain components that change the output from the crystal to electrical impulses which are directed to a photomultiplier tube 57 whose output is indicative of the received radiation. Such electronic circuitry and crystals are well known in the art.

Figure 4:
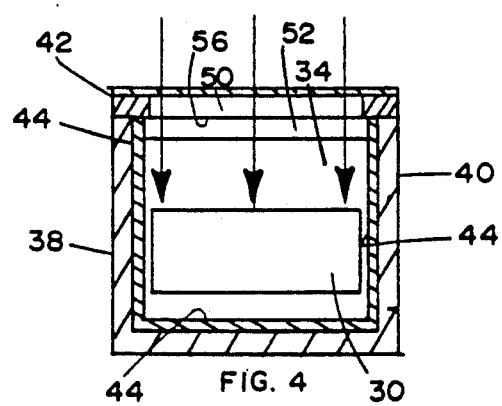
FIG. 4 is a cross-sectional view taken along line 4—4 of FIG. 2.
Figure 5:
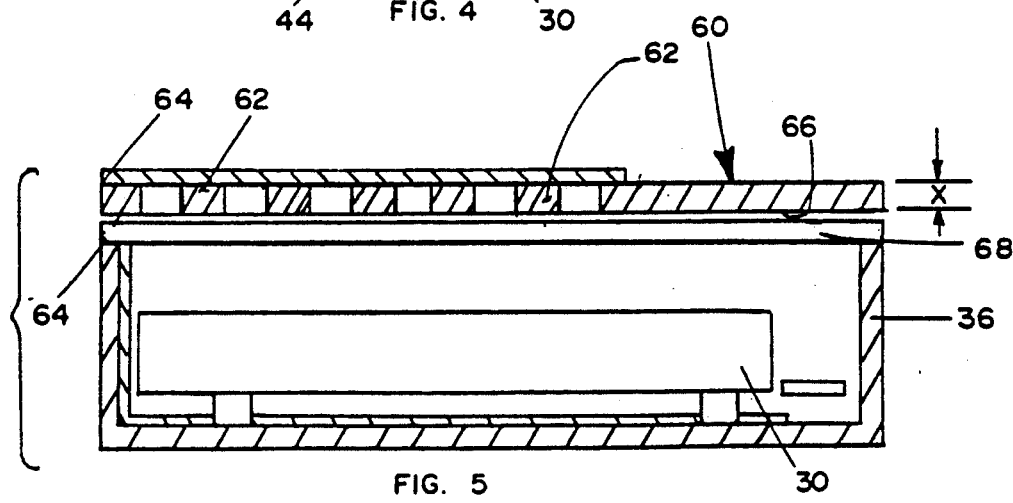
FIG. 5 is a longitudinal cross-sectional view of another embodiment of the present invention.

The elongated openings 50 (FIGS. 3 and 4) are positioned in spaced side-by-side relation in cover 42, and a series of baffles 52 are provided in the cover and include a projecting portion 53 which 52 depends from the lower surface 56 of cover 42. A single baffle is positioned between adjacent openings 50 and is provided with a thickness X. This dimension X is determined by the desired "look" angle $\theta$ (FIGS. 5 and 6). It should be obvious that as the dimension X varies, so does the angle $\theta$.

A protective shield 58 is provided on the top surface of cover 42 to prevent debris from entering the housing 29. Shield 58 is made of a material (such as Plexiglass TM, etc.) which permits the radiation to pass onto the crystal.

FIG. 5 is an elevational view of another embodiment of the present invention wherein like numbers refer to like parts. As seen in FIG. 5, the lower portion of housing 29 (side walls, end walls, and bottom) is similar to that illustrated in FIG. 3 and discussed supra. A different cover 60, however, is used in this embodiment. The cover 60 is provided with baffles 62 which are built into the cover and contained between the upper and lower surfaces 64 and 66, respectively, of the cover. The baffles are spaced a predetermined distance apart to define the angle $\theta$ at which radiation is directed into the housing and onto the sensitive portion of the crystal.

A second protective shield 68 of radiation-pervious material is shown (FIG. 5) to be positioned between the lower surface 66 and the upper portion of housing 29 to serve as a vent for any internal explosions, as is well known in the art. The dimension (thickness) X is chosen so as to produce the desired angle $\theta$ as discussed in conjunction with the embodiment illustrated in FIG. 3.

It is to be understood that while the sensor assembly of the present invention has been discussed in conjunction with a "mining machine," such a mining machine may be longwall or continuous types or any of other types of "mining" machines.

It is to be further understood that the sensor assembly of the present invention measures a substantial thickness of coal where adequate gamma radiation exists in seam boundary coal. Furthermore, the sensor assembly is very rugged, is provided with a moisture-sealed construction, and is easily installed on existing or new mining machines.

It should be noted that the covers for the lower enclosure may, if desired, have a lead lining on the bottom surfaces thereof; however, as shown in the drawings, the covers are made of heavy metal and are thick enough to prevent radiation from passing therethrough.

It is to be yet further understood that the present invention is not limited to the precise embodiments as disclosed herein and that other modifications can be made by one of ordinary skill in the art without departing from the spirit and scope of the invention as defined by the appended claims.

What is claimed is:

1. A radiation sensor assembly comprising:
   a housing forming an enclosure for a radiation sensing element, said housing having a cover member provided with a radiation-pervious section to permit radiation emissions from a source of radiation to pass therethrough to said sensing element, said housing including side, bottom, and a pair of end walls which form a lower enclosure portion, said cover being secured to said side and end walls in spaced relation with said radiation sensing element, said lower enclosure portion having first and second adjoining sections, said first section having said radiation-sensing element therein, and said second section having electronic circuitry means therein including a cathode ray tube for receiving signals from said radiation sensing element and transmitting signals which are indicative of the amount of radiation received by said radiation sensing element, said second section having one of said pair of end walls disposed for supporting said cathode ray collimating means integral with said cover for directing said radiation emissions into said lower enclosure portion and onto said sensing element;
   said radiation-pervious section of said cover being positioned above said first section of said housing and said radiation-sensing element to direct said radiation emissions only on said radiation-sensing element, said collimating means being defined by a plurality of side-by-side spaced openings provided in said radiation-pervious section of said housing, said spaced openings being disposed in substantially parallel relation and extending longitudinally along said radiation-impervious section of said cover, and baffle means including a plurality of baffle members positioned between each said spaced openings of said plurality of spaced openings, said baffle members being provided with a predetermined thickness, said predetermined thickness being chosen so as to control the angle at which the rays of radiation impinge on said radiation-sensitive element;
   a first protective shield of radiation-pervious material positioned over said cover to prevent debris from entering said housing while also permitting the radiation to be directed into said lower portion of said housing; and
   a second protective shield of radiation-pervious material positioned between said cover and said lower portion of said housing.

2. A radiation sensor assembly as set forth in claim 1 wherein said radiation-sensing element is a radiation-sensing crystal.

3. A radiation sensor assembly as set forth in claim 2 wherein said first section of said lower portion of said housing is defined by one end member of said housing, a portion of each opposing side members of said housing, and a portion of said bottom member of said housing, each of said named portions of said members having a lead liner thereon.

4. A radiation sensor as in claim 3 including support means for supporting said radiation sensor assembly during the operation thereof.

5. A radiation sensor as in claim 4 wherein said support means is a mining machine disposed for supporting said radiation sensor assembly adjacent to a coal boundary interface during a coal mining operation, said radiation sensor disposed for sensing radiation emissions passing through said coal interface, whereby the thickness of the coal interface may be determined.

6. A radiation sensor assembly as set forth in claim 3 wherein said cover is provided with upper and lower surfaces, and said baffle plates are contained between said upper and lower surfaces.

7. A radiation sensor assembly as set forth in claim 3 wherein said cover is provided with upper and lower surfaces, and said baffle plates include a projecting portion depending from said lower surface.

* * * * *